United States Patent
Kendig et al.

(10) Patent No.: US 8,002,608 B2
(45) Date of Patent: Aug. 23, 2011

(54) POLISHING OF OPTICAL AND NON-OPTICAL TOOLS FOR IMPROVED MOLD FLOW

(75) Inventors: Stephen Kendig, Atlanta, GA (US); Dee Anna Honea, Dawsonville, GA (US); James Golinski, Lawrenceville, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/700,438

(22) Filed: Jan. 31, 2007

(65) Prior Publication Data

US 2007/0178809 A1    Aug. 2, 2007

(51) Int. Cl.
*B24B 1/00* (2006.01)

(52) U.S. Cl. ............ 451/28; 425/808; 264/1.1; 264/2.5; 264/39; 264/219

(58) Field of Classification Search .................... 451/11, 451/5, 37, 57, 28, 54, 56, 36; 425/808; 264/1.1, 264/1.32, 2.5, 39, 219
See application file for complete search history.

(56) References Cited

U.S. PATENT DOCUMENTS

| | | | |
|---|---|---|---|
| 3,422,168 A | 1/1969 | Bowser | 264/1 |
| 4,681,295 A * | 7/1987 | Haardt et al. | 249/135 |
| 5,402,607 A * | 4/1995 | Lombard | 451/5 |
| 5,702,735 A * | 12/1997 | Martin et al. | 425/548 |
| 5,951,934 A * | 9/1999 | Wickes et al. | 264/225 |
| 6,071,112 A * | 6/2000 | Calvin et al. | 425/445 |
| 6,827,325 B2 * | 12/2004 | Hofmann et al. | 249/134 |
| 6,872,120 B2 | 3/2005 | Miyazawa | |
| 7,422,710 B2 * | 9/2008 | Turner et al. | 264/1.1 |
| 2004/0015261 A1 * | 1/2004 | Hofmann et al. | 700/197 |
| 2004/0246440 A1 * | 12/2004 | Andino et al. | 351/177 |
| 2005/0167864 A1 * | 8/2005 | Turner et al. | 264/1.32 |
| 2009/0230575 A1 * | 9/2009 | Liu et al. | 264/1.1 |

* cited by examiner

*Primary Examiner* — Eileen P. Morgan
(74) *Attorney, Agent, or Firm* — Robert Ambrose

(57) ABSTRACT

This invention is related to the process of polishing the optically critical surface of the front piece as well as the back piece, or non-optical surface, used to make molds used in double-sided molding process to make contact lens for reducing warpage of the mold, radius changes in different cavities and amount of cylindrical distortion. The polishing of both of the front piece and back piece causes the mold material to see a very similar coefficient of friction on both top and bottom surface and provides uniform flow front.

9 Claims, 1 Drawing Sheet

POLISHING OF OPTICAL AND NON-OPTICAL TOOLS FOR IMPROVED MOLD FLOW

This invention is related to contact lenses. In particular, the present invention is related to methods for improving mold flow by polishing optical and non-optical tools used to create molds for contact lenses.

BACKGROUND

Contact lenses are widely used for correcting many different types of vision deficiencies. These include defects such as near-sightedness and far-sightedness (myopia and hypermetropia, respectively), astigmatism vision errors, and defects in near range vision usually associated with aging (presbyopia).

In a conventional molding process, a predetermined amount of a polymerizable or crosslinkable material (prepolymer) typically is introduced into a disposable mold comprising a female (concave) mold half and a male (convex) mold half. The female and male mold halves cooperate with each other to form a mold cavity having a desired geometry for a contact lens. Normally, a surplus of polymerizable or crosslinkable material is used so that when the male and female halves of the mold are closed, the excess amount of the material is expelled out into an overflow area adjacent to the mold cavity. The polymerizable or crosslinkable material remaining within the mold is polymerized or cross-linked by means of actinic radiation (e.g., UV irradiation, ionized radiation, microwave irradiation) or by means of heating. The starting material in the mold cavity is cured to form a lens while the excess material in the overflow area is partially or completely cured to form flash. After curing, the mold is separated into the male and female mold halves with the formed lens adhered onto either male or female mold half.

The molds that are used in the above-described process are created using tools or "master molds." Two tools are needed to create one mold halve; hence four tools are needed to create an entire mold. Optical tools may be formed from any optically acceptable material stock, preferably in rod form. The stock is typically cut and roughed in to the general shape of the tool. The tool is then lathed to more exact specifications. The two tools that are used to create the portions of the mold halves that contact the contact lens prepolymers (front tools) may then be polished to remove any lathe marks. The polishing of the front tool without polishing the back tool causes the mold material to be affected by the different coefficient of friction on the top and bottom surfaces (boundary layer effects), which causes a non-uniform flow front. The present invention seeks to correct these inadequacies of the prior art

SUMMARY OF THE INVENTION

In accomplishing the foregoing, there is provided, in accordance with one aspect of the present invention a method for creating an ophthalmic lens mold that includes polishing a first side of an optical tool, wherein the first side of the optical tool creates the portion of a mold that contacts prepolymers; and polishing a second side of an optical tool, wherein the second side of the optical tool does not create the portion of the mold that contacts prepolymers. According to the present invention polishing the second side reduces cylindrical distortion in a resultant lens by reducing boundary layer effects, ie., creating a more uniform flow front. In one embodiment of the present invention, polishing may be achieved by using diamond compound paste, a polishing pad, and/or magnetic resonance.

These and other aspects of the invention will become apparent from the following description of the preferred embodiments taken in conjunction with the table. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Figure 1:
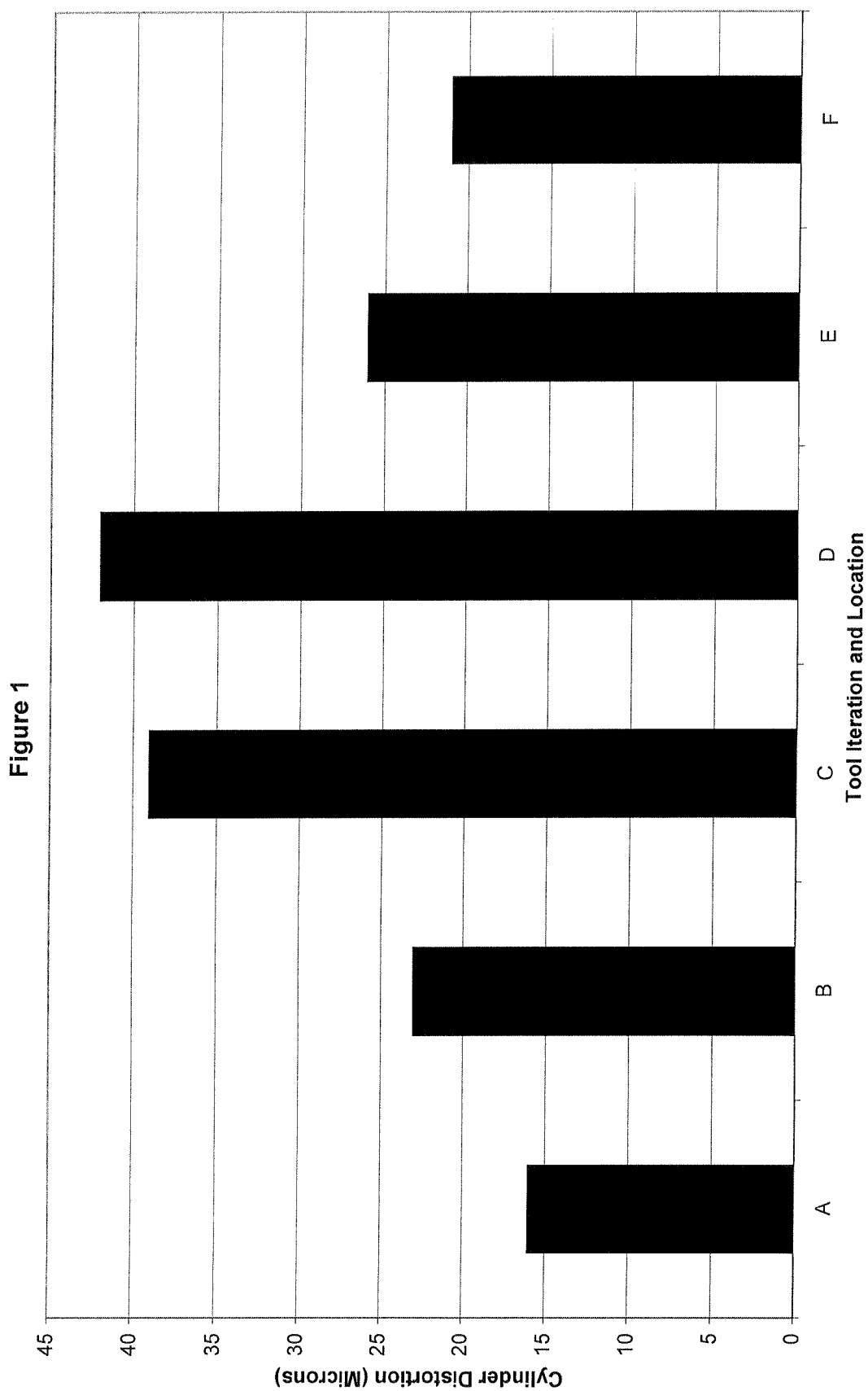
FIG. 1 is a graph showing the resultant cylinder for polished and unpolished tools.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the manufacturing procedures are well known and commonly employed in the art. Conventional methods are used for these procedures, such as those provided in the art and various general references. Where a term is provided in the singular, the inventors also contemplate the plural of that term.

The present invention relates to the process of polishing optical tools, as well as non-optical tools, used to make molds used in double-sided molding processes (DSM processes). As stated previously optical tools, sometimes referred to as "master molds", are needed to create one mold halve, to be used in DSM processes. These optical tools may be created though a series of machining operations before they meet specifications. These machining operations may include milling, lathing, and possible polishing.

Typically, only one tool is polished, that tool being the optical surface. The polishing of the front tool without polishing of the back tool causes the mold material to see a different coefficient of friction on both top and bottom surfaces, which causes a non-uniform flow front. This non-uniform flow front causes warpage of the mold, radius changes in different cavities and large amounts of cylindrical distortion. Additionally, Polypropylene, a common lens mold material, has physical/molecular properties such that shrinkage occurs in the direction of mold flow. Such shrinkage creates cylindrical distortion in the mold which causes cylinder in the lenses produced from the mold.

The optical tools are first produced by any method including, without limitation, by single, diamond point turning of a suitable material. Typically, optical tools may be shaped using a controlled-waviness, diamond cutting tool with as many as two finish cuts using the same tool. One ordinarily skilled in the art will recognize that a controlled-waviness tool is a tool that, no matter at what point on the cutting portion of the tool the cut is made, the radius at that point is that specified by the tool maker, within tolerances, with only minimal, local deviations. Such a tool provides that the final part cut will be extremely accurate. The tool nose radii may range from about 100 to 500 micrometers.

Polishing of the optical tools to provide the optically critical surfaces of the invention may be carried out by any convenient method. Preferably, polishing is performed by using a heavy carbon diamond polishing compound applied to a cloth and a jig shaped to match the insert radius. The insert and jig are placed into the polisher for an appropriate amount of time, for example between about thirty seconds and about one minute, and then removed and swabbed with a suitable solvent, such as an alcohol, to remove the polishing compound. The optical tool is then inspected and the process repeated as necessary. The optical tool is finally inspected by any convenient method including, an interferometer or a vision system, to ensure that the radius meets the design specifications.

Lathing or polishing techniques used to polish the back surface may be similar or different than those used for the front surface. For example, the ratio of linear feed rate, or the rate at which the diamond tool tracks across the surface of the part measured in mm/min, to the spindle speed in rev./min is used that is sufficient to provide the desired increment between each lathe line or spiral. To obtain lathe lines at 1 micron intervals, one uses 5 mm/min linear feed and 5,000 rpm, 10 mm/min linear feed and 10,000 rpm, or any figures that provide the ratio of 1/1000. To obtain lathe lines less than 300 nm apart, the appropriate ratio to be used is 3/10000 or a linear feed of 2.4 mm/min with a spindle speed of 8000 rpm. Diamond polishing paste may also be used. In an alternative embodiment other types of polishing may be used such as using programmable polishing machines or magnetic resonance.

In an embodiment of the present invention, both mated tools (the optical and non-optical surfaces) are polished, creating more uniform flow and hence, reducing cylindrical distortion. Reducing cylindrical distortion is particularly imported in asymmetrical molds and lenses, such as lenses and/or molds developed with prism ballast or similar features. According to the present invention, the optically critical surface of the optical tool as well as the back piece, or non-optical surface, are preferably polished to reduce cylindrical distortions FIG. 1 illustrates the effect of polishing non-optical tools on cylinder. Cylindrical distortion was determined by measuring mold radius at the zero degree mold orientation Vs 90 degrees in the direction of flow with a Nikon Z120 (precision CNC vision/laser 3D measuring system), interferometer or any other radius measuring device. Referring to FIG. 1 the x axis of the graph represent the tool iteration and location. The y-axis represents the cylinder in Microns. Bars A, B, E and F are plotted results from tools that were polished, whereas bars C and D represent unpolished tools. As is shown by the graph, polishing of the non-optical surfaces results in cylindrical distortion of less than 30 microns for asymmetrical molds and spherical molds.

The present invention may be used for any molded product or material. Exemplary mold product materials include, but are not limited to polypropylene, polycarbonate, Zenor family of polymers, topaz or PET.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

We claim:

1. A method for creating a mold half for making a contact lens comprising the steps of:
    obtaining a front tool and a back tool, wherein the front tool and the back tool are needed to create the mold half;
    polishing a first side of the front tool to obtain an optically critical surface, wherein the first side of the front tool creates the portion of the mold half that contacts prepolymers of a contact lens to be formed using the contact lens mold;
    polishing a side of the back tool, wherein the polished side of the back tool creates a portion of the mold half that does not contact the prepolymers of the contact lens to be formed using the contact lens mold; and
    mating the front tool and a back tool and introducing a flowable mold material between the polished sides of the front tool and the back tool, thus creating the mold half.

2. The method of claim 1, wherein polishing said second side reduces boundary layer effects.

3. The method of claim 1, wherein said polishing is achieved by one or more of the following: using diamond compound paste and using a polishing pad.

4. The method of claim 1, wherein said polishing is achieved by using magnetic resonance.

5. A method of creating a mold half for making a contact lens comprising the steps of:
    milling rod material to create a front tool and a back tool, wherein the front tool and the back tool are needed to create a mold half for making a contact lens;
    lathing the front tool and the back tools,
    polishing a first side of the front tool to obtain an optically critical surface, wherein the first side of the front tool creates the portion of the mold half that contacts prepolymers of a contact lens to be formed using the contact lens mold;
    polishing a side of the back tool, wherein the polished side of the back tool creates a portion of the mold half that does not contact the prepolymers of the contact lens to be formed using the contact lens mold; and
    mating the front tool and a back tool and introducing a flowable mold material between the polished sides of the front tool and the back tool, thus creating the mold half.

6. The method of claim 5, wherein polishing said second side reduces cylindrical distortion in a resultant lens.

7. The method of claim 5, wherein polishing said second side reduces boundary layer effects.

8. The method of claim 5 wherein said polishing is achieved by one or more of the following: using diamond compound paste and using a polishing pad.

9. The method of claim 5, wherein said polishing is achieved by using magnetic resonance.

* * * * *